United States Patent
Ruiz et al.

(10) Patent No.: US 6,945,573 B2
(45) Date of Patent: Sep. 20, 2005

(54) EXTERNALLY ADJUSTABLE LATCH

(75) Inventors: Antonio Ruiz, Santa Ana, CA (US); Braskel Elmer Phillips, West Corvina, CA (US)

(73) Assignee: Hartwell Corporation, Placentia, CA (US)

( * ) Notice: Subject to any disclaimer, the term of this patent is extended or adjusted under 35 U.S.C. 154(b) by 0 days.

(21) Appl. No.: 10/404,172

(22) Filed: Apr. 1, 2003

(65) Prior Publication Data

US 2004/0012208 A1 Jan. 22, 2004

Related U.S. Application Data

(60) Provisional application No. 60/369,477, filed on Apr. 1, 2002.

(51) Int. Cl.[7] .................................... E05C 5/00
(52) U.S. Cl. .................. 292/109; 292/DIG. 60
(58) Field of Search ................ 292/113, 109, 292/DIG. 60

(56) References Cited

U.S. PATENT DOCUMENTS

| | | | | |
|---|---|---|---|---|
| 2,927,812 A | * | 3/1960 | Smith et al. ............... | 292/196 |
| 3,105,711 A | * | 10/1963 | Woodworth et al. ........ | 292/113 |
| 4,053,177 A | * | 10/1977 | Stammreich et al. ....... | 292/113 |
| 4,116,479 A | * | 9/1978 | Poe ............................ | 292/113 |
| 4,159,137 A | * | 6/1979 | Richter ...................... | 292/123 |
| 5,620,212 A | * | 4/1997 | Bourne et al. .............. | 292/113 |

* cited by examiner

Primary Examiner—Gary Estremsky
(74) Attorney, Agent, or Firm—Barnes & Thornburg LLP

(57) ABSTRACT

The present disclosure envisions an externally controllable adjustment assembly which is carried on the bolt of a latch assembly. The externally controllable adjustment assembly is generally flush-mounted relative to the exterior surfaces of a corresponding panel and structure. A small access opening is provided to access the adjustment assembly so as to help maintain the aerodynamic design of the latch. The externally controllable adjustment assembly includes an adjuster which works with an adjuster body. An external force is applied by the adjuster to one end of the adjuster body to transfer forces to a plunger positioned at the opposite end of the adjuster body. Adjustment of the plunger helps to adjust the latching force of the latch on the structure. The present disclosure allows for controllable external adjustment as well as controllable preloading of the forces on the latch. The adjuster can be controllably preloaded by using a torque-wrench or torque measuring device to make adjustments to a desired level of force.

15 Claims, 4 Drawing Sheets

EXTERNALLY ADJUSTABLE LATCH

CROSS REFERENCE

This application claims priority under 35 U.S.C. 119(e) to U.S. Provisional Application Ser. No. 60/369,477 filed Apr. 1, 2002 which is expressly incorporated herein by reference.

BACKGROUND

The present disclosure relates to an externally adjustable latch for use in latching doors or moveable panels to a corresponding structure.

A variety of latches are available for closing doors and maintaining panels in position against structures. One version of such a latch attaches to the panel to be retained and has an extending bolt portion which abuts a corresponding internal surface of the structure surrounding the panel. The most basic form of this latch does not have any adjustability and cannot be adjusted to a variable preload. Preload can only be achieved by a very basic system of adding shims between the bolt and the corresponding structure.

Another version of latches have been developed which allows some degree of adjustability. In this prior art device, an adjustable screw is provided on the bolt end which abuts the corresponding structure. The adjustable portion is not easily adjustable. The adjustment must be made internally, on the inside of the panel once it is closed and the latch is engaged. This of course requires somebody to adjust the mechanism from the inside and another person to open and close the latch on the outside. This can be a problem because the interior surface may not have sufficient room to reach the adjustment portion or to properly make adjustments. Alternatively, the latch can be adjusted by opening and making incremental adjustments to the latch, closing the panel and checking the fit, reopening the panel making adjustments to the latch. This process can be quite labor intensive and may not provide a suitably tight latching of the panel against the structure.

It should be noted that variable load is not achievable in the latch without adjustment. This is also true of the latch which has the adjustment mechanism described above requiring numerous adjustment steps. It is common for there to be multiple latches on a single panel or door. The problems discussed here and above with the prior art are complicated when multiple latches are used on a panel to secure different portions of a particular edge or different edges.

One of the problems that results when the panels are not adjustable or not properly adjusted is that vibration of the panel can occur. The gaps or spacing associated with each latch provides some degree of movement in the panel. The movement can be induced by pressure differential between the interior and exterior pressures on the panel or door, as well as vibrations transmitted to the panel. Vibrations transmitted to the panel occur on aircraft when the panels are used in structures which have vibrations such as coverings for engine and other mechanical systems.

An additional issue which arises with prior art devices is that lock wire or jam nuts are required to be attached to the adjustable bolts thereby requiring additional labor to install the lock wire or jam nut as well as to remove it when making additional adjustments. For example, when adjusting the prior art adjustment screws, the adjustments are made as noted above. Once the desired adjustment is achieved, the lock wire or jam nut is attached to the adjuster to maintain the desired adjustment. As often happens with such adjustable structures, when further adjustment is required, the lock wire or jam nut must be removed. Further adjustment made and then reattachment of the lock wire or jam nut. It should also be noted that adjustment is not easy since it may require two wrenches to adjust the adjustable structure.

The present disclosure envisions an externally adjustable mechanism which is carried on the bolt of a latch. The externally adjustable mechanism has an exterior portion which is generally flush-mounted relative to the exterior surfaces of the corresponding panel and structure. A small access opening is provided to access the adjustment structure so as to help maintain the aerodynamic design of the flush-mounted latch. The externally adjustable mechanism includes an adjuster which works with a moveable lever. Force is applied to one end of the moveable lever operate on a plunger carried on an opposite end of the lever. The present disclosure allows for controllable external adjustment as well as controllable preloading of the forces on the latch. The adjuster can be controllably preloaded by using a torque-wrench or torque-measuring device to make adjustments to a desired level of force.

Additional features will become apparent to those skilled in the art upon consideration of the following detailed description of drawings.

DETAILED DESCRIPTION OF THE DRAWINGS

Figure 1:
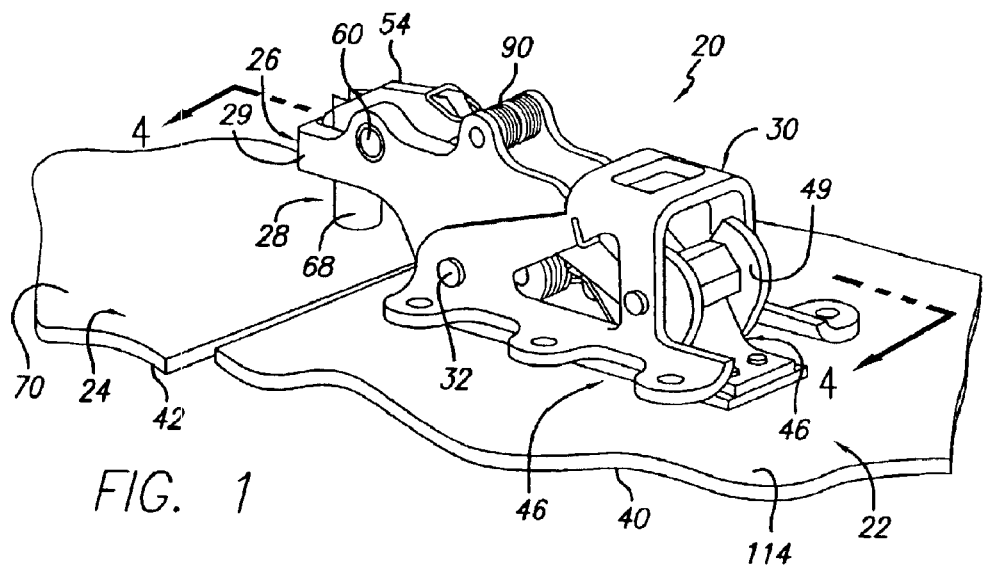
FIG. 1 is an interior perspective view of a latch attached to a panel and having a bolt and plunger extending from the panel to abut a structure in close proximity to the panel.

While the present invention may be susceptible to embodiment in different forms, there is shown in the drawings, and herein will be described in detail, embodiments with the understanding that the present description is to be considered an exemplification of the principles of the disclosure and is not intended to limit the disclosure to the details of construction and the arrangements of components set forth in the following description or illustrated in the drawings.

As shown in the Figures, a latch assembly 20 is attached to a first structure or panel 22 to engage against a second structure or structure 24. The latch assembly 20 includes a bolt 26 having a plunger assembly 28 extending from a first end 29 of the bolt 26. The bolt 26 is moveably attached to frame 30. As shown, the bolt 26 is pivotably carried on the frame 26 and generally rotatable about a pivot pin 32. The frame 30 attaches to the panel 22 to retain the latch assembly 20 in a desired location and orientation relative to the panel 22 and structure 24. As referred to in this disclosure, frame 26 is intended to be broadly interpreted to include any structure or body to which at least some of the latch components are attached to mount the latch assembly on another structure to provide the desired function as described in this disclosure and shown in the figures and all equivalents thereof.

An example of the use of this latch assembly 20 would be on an aircraft or other vehicle which has a panel or door 22 to be secured in a position relative to another structure 24. The latch assembly 20 may be used alone or in combination with multiple latch assemblies to hold the panel 22 in a desired position.

Figure 2:
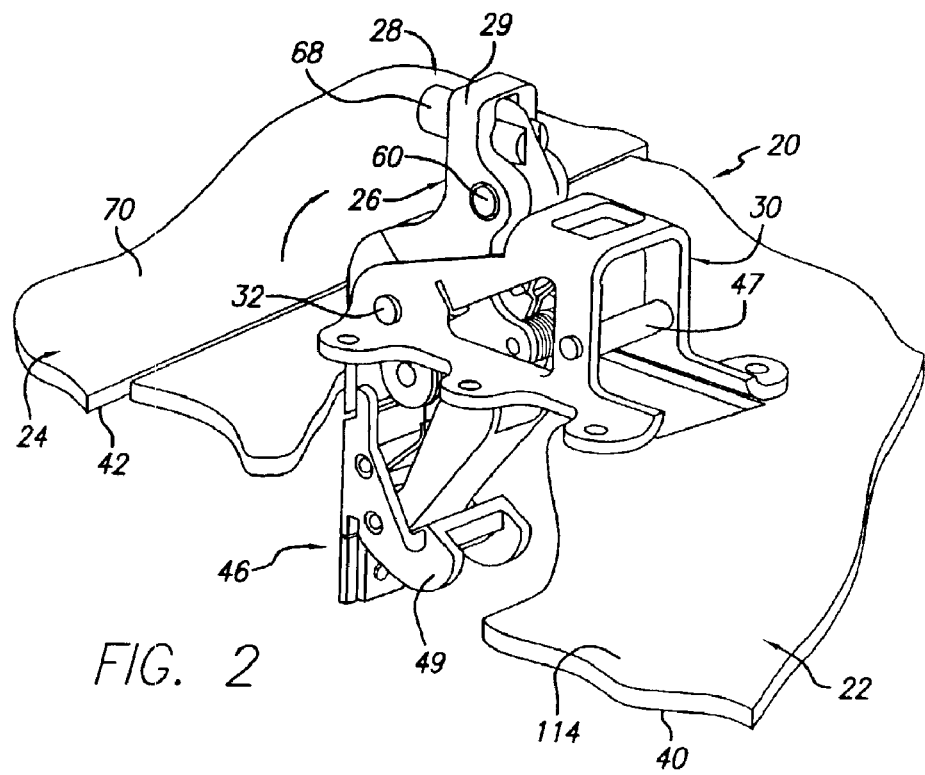
FIG. 2 is an interior perspective view of the latch as shown in FIG. 1 in which the bolt and plunger have been rotated away from the structure to allow the panel to be displaced relative to the structure.
Figure 3:
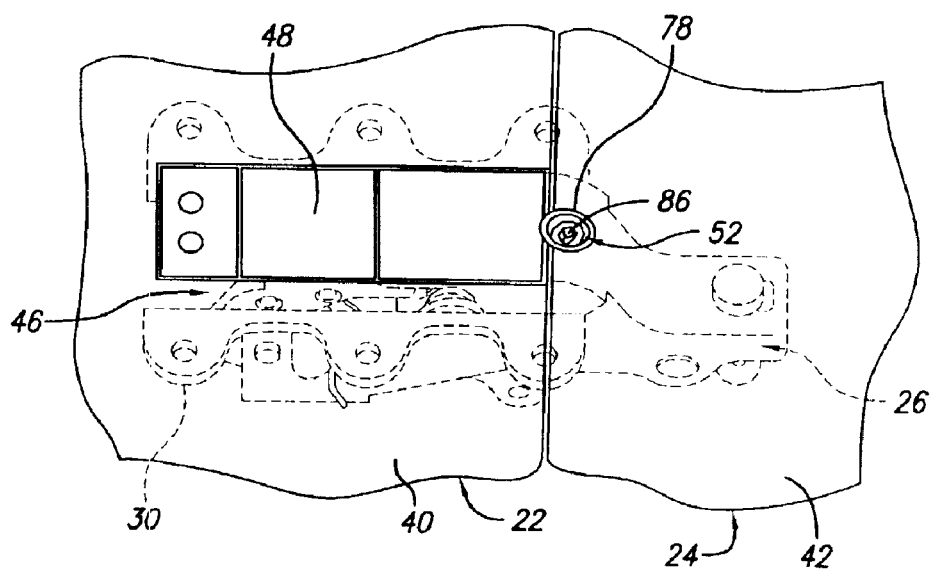
FIG. 3 is an exterior perspective view of the latch as shown in FIGS. 1 and 2 securing the panel relative to the structure and in which features of the latch retained interiorly are shown in broken lines.

FIGS. 1 and 2 show views taken from an internal area relative to the panel 22 and structure 24. FIG. 3 provides a view of an exterior surface 40 of the panel 22 and an exterior surface 42 of the structure 24. Reference to FIGS. 2 and 3, a trigger assembly 46 is operatively associated with the latch assembly 20 including a trigger or release button 48. The trigger assembly 46 operates in accordance with known trigger assemblies associated with latch assemblies 20. For example, the frame 26 includes a trigger bushing 47 and the trigger assembly 46 includes a hook 49 which is engageable with the bushing 47 to retain the bolt 26 in a closed position. Operation of the trigger 46 disengages the hook 49 from the bushing 47 to allow the bolt 26 to pivot relative to the frame 46.

Figure 4:
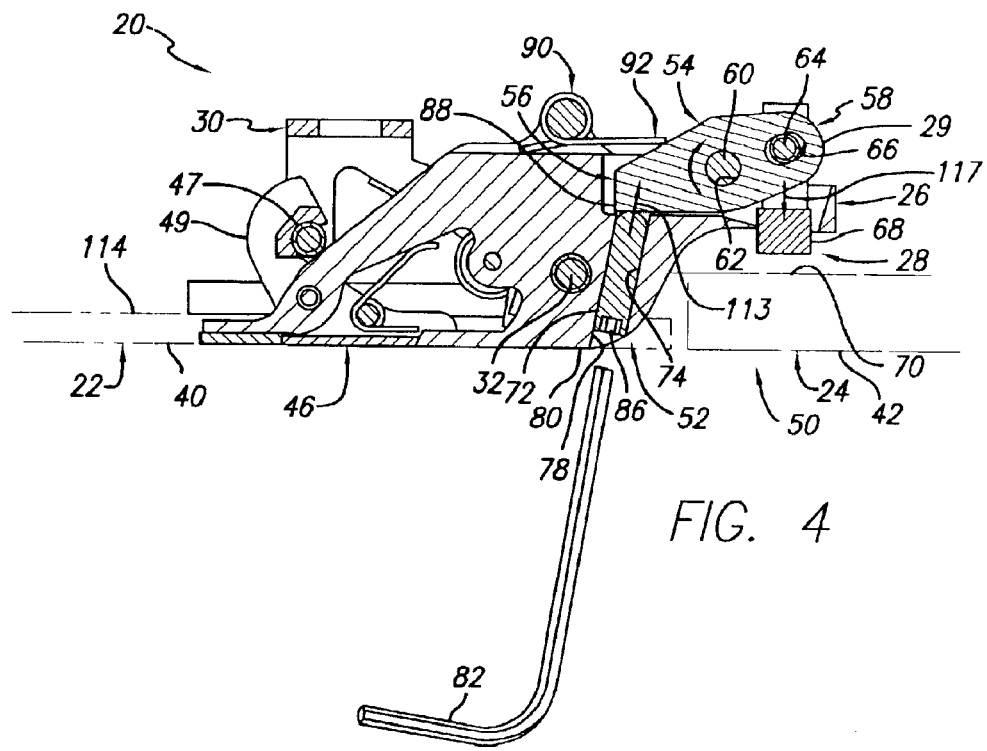
FIG. 4 is a partial fragmentary, cross-sectional, side elevational view of the latch taken along line 4—4 in FIG. 1 showing a plunger which is being adjusted to contact the structure.
Figure 5:
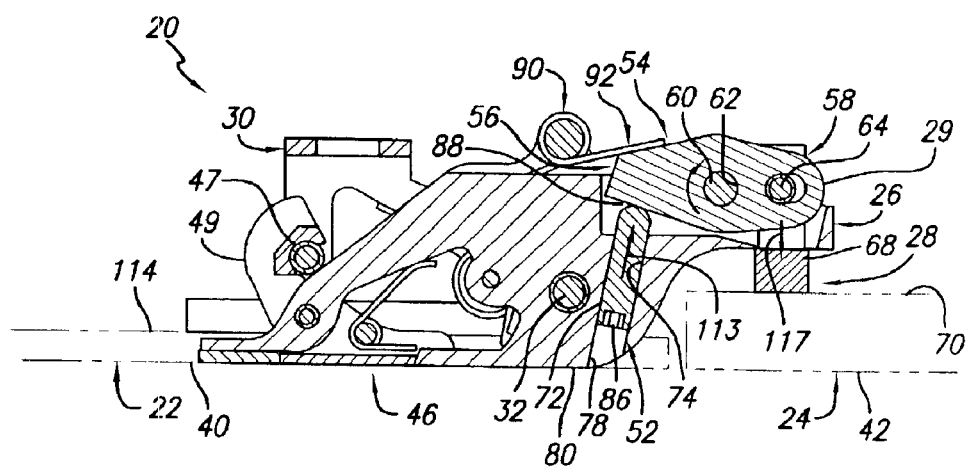
FIG. 5 is a partial fragmentary cross-sectional, side-elevational view of the latch as shown in FIG. 4 in which an adjuster has been operated to displace a lever causing the plunger to engage a corresponding surface the structure.
Figure 6:
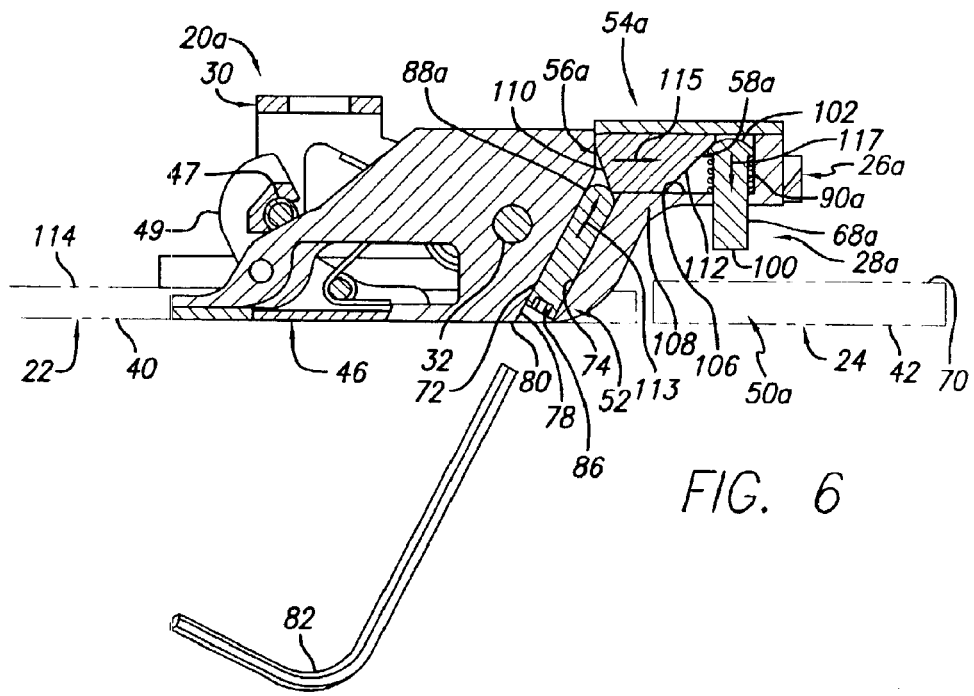
FIG. 6 is an alternate embodiment which is similar to that as shown in FIG. 4 in which the latch is being prepared to be adjusted so that the plunger engages the structure.
Figure 7:
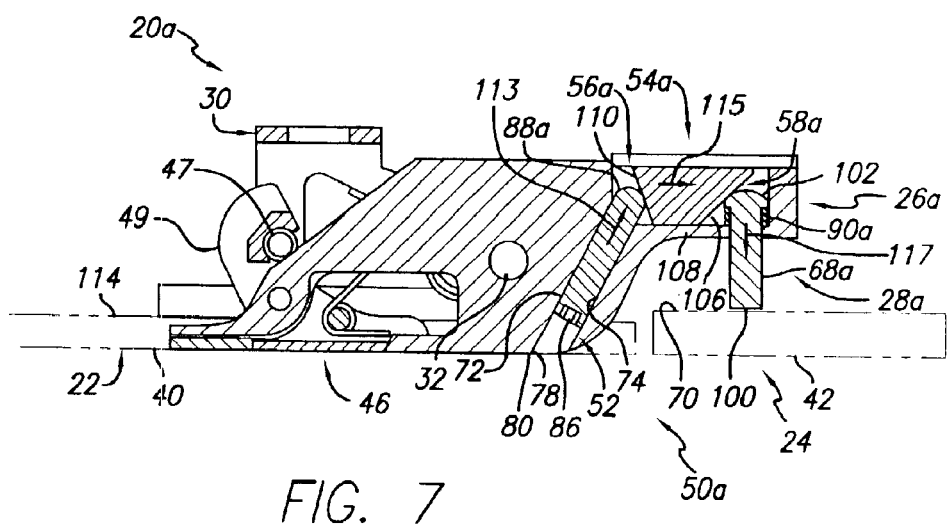
FIG. 7 is a view similar to that as shown in FIG. 5 in which the plunger has been adjusted.

The details of the present latch assembly 20 shown and described herein will focus on an adjustment assembly 50 as shown in FIGS. 4 and 5 and in a second embodiment of an adjustment assembly 50a as shown in FIGS. 6 and 7.

As generally shown in FIGS. 1–7, the adjustment assembly 50, 50a includes an adjuster 52 operatively associated with, or as shown, carried on the bolt 26. The adjustment assembly 50, 50a also includes an adjuster 54, 54a carried on the bolt 26. The adjuster body 54, 54a in FIGS. 1–5 is shown as an adjuster lever 54 having a first end 56 and a second end 58. A pivot pin 60 extends through a corresponding bore 62 in the adjuster lever 54 with the pin 60 engaging corresponding portions of the bolt 26. The plunger assembly 28 is pivotally carried on the second end 58. A pin 64 extends through a slot 66 in the adjuster lever 54 and through a corresponding bore (not shown) in a plunger arm 68. The slot 66 may be elongated to provide additional adjustable movement of the plunger arm 68 relative to an interior surface 70 of the structure 24.

The adjuster 52 includes threads 72 on an exterior surface thereof to engage corresponding threads 74 formed in a bore 74 in the bolt 26. Additionally, a helicoil can be inserted into the threaded bore 74 to provide additional retention of the threaded adjuster 52 therein. The helicoil resists disengagement of the threaded adjuster 52 from the threaded bore 74. A mouth 78 of the bore 74 communicates with an exterior surface 80 of the latch assembly 20. In this regard, the threaded adjuster 52 can be accessed from an outside surface using a tool 82. This is a substantial improvement over the prior art which required adjustment of the plunger assembly 28 from an interior surface 70 of the structure 24 and panel 22.

The adjuster 52 includes a drive end 86 which is formed to received a tool 82 for adjustment of the adjuster 52. A distal end 88 abuts the first end 56 of the adjuster lever 54. Driving of the adjuster 52 inwardly towards the first end 56 of the adjuster lever 54 causes generally clockwise rotation (relative to the view illustrated) of the adjuster lever 54 about the pivot pin 60. Clockwise rotation of the adjuster lever 54 causes an upward movement of the first end and a corresponding downward movement of the second end 58.

Downward movement (clockwise rotation relative to the view illustrated) of the second end 58 causes the plunger arm 68 to advance toward the interior surface 70 of the structure 24. The load on the bolt 26 at the plunger assembly 28 can be adjusted by using a torque wrench or torque measuring tool at the drive end 86 of the adjuster 52. In this regard, a desired load can be set at the plunger assembly 28 without having to work from the interior surface 70 or to open and close the panel 22 numerous times as is required by the prior art. A spring 90 is provided to provide a biasing force 92 on the lever 54. In this regard, the spring 90 provides a force against the lever 54 to maintain the first end 56 in engagement with the distal end 88 of the adjuster 52. The spring 90 provides a return mechanism when the adjuster 52 is driven outwardly from the bolt 26 and away from the first end 56 of the lever 54.

With reference to FIGS. 6 and 7, the adjuster assembly 50a is shown. The adjustment assembly 50a includes the adjuster 52. The adjuster 52 is threadedly engage in the threaded bore 74 defining a mouth 78 allowing adjustment with the tool 82 inserted through the mouth 78 from the exterior of panel 22. The adjuster 52 includes the drive end 86 and the distal end 88. As also shown in FIGS. 6 and 7, a plunger arm 68a is provided. The plunger arm or plunger 68a has a contact end 100 and a lever end 102. A spring 90a provides a biasing effect similar to that described in FIGS. 1–5 in which the spring 90a urges the plunger 68a toward the adjuster body 54a.

The adjuster body 54a shown in FIGS. 6 and 7 provides generally the same function as the adjuster body 54 in FIGS. 1–5. However, the adjuster body 54a shown in FIGS. 6 and 7 has a different structure. The structure of the adjuster body 54a is in a slide body which travels in a generally linear direction within a channel 106 defined by a channel housing 108 of the bolt 26a.

The adjuster body 54a provides a leveraging action as a result of the distal end 88a of the adjuster 52 acting on an adjuster face 110, in the form of an adjuster bevel as illustrated, to drive the adjuster body 54a towards the lever end 102 of the plunger 68a which contacts a plunger face 112, in the form of a plunger bevel as illustrated, of the adjuster body 54a. The adjuster 52 provides forces 113 to act on the adjuster face 110 thereby generally linearly displacing 115 the adjuster body 54a towards the plunger 68a. As a result, the plunger face 112 acts on the plunger end 102 of the plunger 68a driving 117 the plunger 68a toward the structure 24. When the forces 113 imposed by the adjuster 52 exceed the forces exerted by the spring 90a, the plunger 68a is driven downwardly towards the interior surface 70 of the structure 24. The angle of the faces 110, 112 provide adjuster body 54a and the associated plunger 68a. The faces 110, 112 could also be curved surfaces and may include a coating or material chosen to enhance the operation of the latch. For example, a Teflon surface could be applied to the faces 110, 112 to enhance the sliding characteristics of the ends 88a, 102 relative to the corresponding faces 110, 112, respectively.

When the adjuster 52 is threadedly disengaged or moved outwardly away from the adjuster body 54a, the spring 90a provides expanding forces to push upwardly on the plunger 68a relative to the housing 108.

In use, the latch assembly 20, 20a as disclosed includes a frame 30 attached to an interior surface 114 of a panel 22. The bolt 26, 26a and trigger assembly 46 are pivotally carried on the frame 30 by a pivot pin 32 generally in accordance with known structures in the latching arts.

The latch assembly 20 includes the adjuster assembly 50, 50a carried on the bolt 26, 26a. The adjuster assembly includes an adjuster body 54, 54a carried on the bolt 26, 26a. A first end 56, 56a of the adjuster 54, 54a is contacted by an adjuster 52. A second end 58, 58a contacts a plunger 68, 68a. Movement of the adjuster 52 relative to the first end 56, 56a causes movement of the second end 58, 58a to operate against the plunger 68, 68a.

Adjustment of the adjuster body 54, 54a which is retained relative to the bolt 26 and the interior surfaces 114, 70 of the panel 22 and structure 24, respectively, facilitates external adjustment of the plunger assembly 28, 28a. The spring, 90, 90a is provided to produce biasing forces on the adjuster body 54, 54a to return the adjuster body 54, 54a when the adjuster 52 is moved generally away from the adjuster body 54, 54a.

The latch assembly 20 as disclosed provides means for adjusting 50, 50a for controllably adjusting engagement forces of a bolt 26, 26a on a panel 22 against a structure 24. The adjusting means 50, 50a includes means 52 for adjusting the assembly. The adjuster means 52 transfers forces to an adjustment body 54, 54a to act on a corresponding plunger assembly 28, 28a. Operation of the adjuster means 52 also at least assists in retaining a desired adjustment. The adjusting means 50, 50a being controllably adjustable for an area exterior of the panel 22 and structure 24.

The externally controllable adjustment assembly 50, 50a is carried on the bolt 26, 26a of the latch assembly 20, 20a. The externally controllable adjustment assembly 50, 50a is generally flush-mounted relative to the exterior surfaces 40 of a corresponding panel 22 and structure 24. The small access opening 78 is provided to access the adjustment assembly 50, 50a so as to help maintain the aerodynamic design of the latch 20, 20a. The externally controllable adjustment assembly includes an adjuster 52 which works with an adjuster body 54, 54a. An external force 113 is applied by the adjuster 52 to one end of the adjuster body 54, 54a to transfer forced to the plunger 68, 68a positioned at the opposite end of the adjuster body 54, 54a. Adjustment of the plunger 68, 68a helps to adjust the latching force of the latch on the structure 24. The present disclosure allows for controllable external adjustment as well as controllable preloading of the forces on the latch 20, 20a. The adjuster 52 can be controllably proloaded by using a torque-wrench or torque measuring device to make adjustments to a desired level of force.

While embodiments of the disclosure are shown and described, it is envisioned that those skilled in the art may devise various modifications and equivalents without departing from the spirit and scope of the disclosure as recited in the following claims.

What is claimed is:

1. A latch assembly of for use in latching a first structure relative to a second structure comprising:
   a frame attachable to a first structure;
   a bolt moveably carried on the frame;
   the bolt being sized and dimensioned to extend from a first structure to overlie at least a portion of a second structure;
   a trigger assembly operatively associated with the bolt and engageable with at least a portion of the frame to retain the bolt in a closed position and disengagable from the frame to allow movement of the bolt;
   an adjustment assembly operatively associated with the latch;
   an adjuster body of the adjustment assembly operatively associated with the bolt, the adjuster body having a first end and a second end;
   a controllable adjuster of the adjustment assembly adjustably retained on the bolt for acting on the first end;
   a plunger assembly operatively associated with the bolt;
   the plunger assembly having a first end communicating with the adjuster body and a second end for abutting an interior surface of a second structure;
   wherein the adjuster may be controllably adjusted to act on the first end of the adjuster body to adjust the plunger assembly carried relative to an interior surface of the second structure; and
   wherein the adjuster is threaded, the bolt defining a threaded bore therein positioned proximate to the first end of the adjuster body for receiving the adjuster therein, adjustment of the adjuster being accomplished by threadedly moving the adjuster in the threaded bore.

2. The latch assembly of claim 1, further comprising the adjuster body being a lever pivotally retained on the latch assembly.

3. The latch of claim 2, wherein the plunger assembly is retained on the pivotable lever.

4. The latch of claim 2, the pivotable lever including a first end and a second end generally positioned on opposite sides of a pivot point of the lever, the adjuster abutting the first end and the plunger assembly carried on a second end, whereby adjustment of the adjuster abutting the first end operates to pivot the lever about the pivot point to move the plunger retained thereon relative to an interior surface of a second structure.

5. The latch of claim 2, further comprising a spring carried on the latch assembly, the spring acting on the lever to apply a force to the lever relative to the adjuster.

6. The latch assembly of claim 1, further comprising the adjuster body being a slide body displaceably retained on the latch assembly.

7. The latch assembly of claim 1, further comprising a helicoil retained in the threaded bore approximate to the threaded adjuster for retaining a desired threaded adjustment of the adjuster.

8. The latch assembly of claim 1, further comprising the threaded bore having a mouth defined at an exterior surface of the latch assembly for access from an exterior surface of the first structure to which the latch assembly is attached.

9. The latch assembly of claim 1, further comprising a spring carried on the latch assembly, the spring acting to apply a force relative to the adjuster body and generally opposite a force exerted by the adjuster.

10. The latch assembly of claim 1, further comprising the bolt being pivotally retained on the frame, the bolt defining a pivot bore, a pivot pin extending through the pivot bore and a corresponding portion of the frame to pivotally retain the bolt on the frame.

11. The latch of claim 1, in which the adjuster body is a slide device movably retained on the bolt for sliding movement relative to the adjuster and the plunger assembly.

12. The latch as in claim 11, wherein the slide device is generally linearly displaceable relative to the bolt, adjustment of the adjuster operating to linearly displace the slide device to act on the plunger assembly and adjust the position of the plunger assembly relative to an interior surface of a second structure.

13. The latch of claim 12, further comprising an adjuster bevel positioned on the slide device proximate to the adjuster and a plunger bevel positioned on the slide device proximate to the plunger assembly, the adjuster acting on adjuster bevel to apply forces thereto and generally linearly displace the slide device toward the plunger assembly, the plunger bevel acting on the plunger to displace the plunger assembly relative to an interior surface of a second structure.

14. The latch of claim 12, further comprising a spring retained relative to the plunger assembly for imposing forces to urge the plunger assembly towards the slide device, movement of the slide device toward the plunger assembly generally compressing the spring and urging the plunger away from the slide device, and movement of the slide device away from the plunger assembly resulting in the spring generally urging the plunger assembly toward the slide device.

15. A latch assembly for use in latching a first structure to a second structure with the latch being attached to the first structure and comprising:

a frame attachable to a first structure;

a bolt moveably carried on the frame;

the bolt being sized and dimensioned to extend from a first structure to overlie at least a portion of a second structure;

a trigger assembly operatively associated with the bolt and engageable with the frame to retain the bolt in a closed position and disengagable from the frame to allow movement of the bolt;

an adjuster body moveably carried on the bolt;

an adjuster body being pivotable lever pivotally retained on the bolt;

an adjuster body having a first end and a second end;

a controllable adjuster adjustably retained on the bolt for acting on the first end of the adjuster body;

a plunger assembly carried on the bolt proximate to a second end of the adjuster body for abutting an interior surface of a second structure;

the plunger assembly being retained on the pivotable lever;

wherein the controllable adjuster is controllably adjustable to act on the first end of the adjuster body to adjust the plunger assembly relative to an interior surface of the second structure for adjusting a clamping force produced by the latch on a second structure when in a latched position;

the pivotable lever including a first end and a second end generally positioned on opposite sides of a pivot point of the lever, the adjuster abutting the first and the plunger assembly carried on a second end, whereby adjustment of the adjuster abutting the first end operates to pivot the lever about the pivot point to move the plunger assembly retained thereon relative to an interior surface of a second structure; and;

the plunger assembly includes a plunger arm having a slot therein, the second end of the pivotable lever positioned in the slot, a lever pin extending through the plunger and through the slot in the second end of the pivotable lever for retaining the plunger on the second end of the pivotable lever.

* * * * *